US010729244B2

(12) United States Patent
Hansen, II et al.

(10) Patent No.: US 10,729,244 B2
(45) Date of Patent: Aug. 4, 2020

(54) RECONFIGURABLE STORAGE ASSEMBLY

(71) Applicant: A.L. Hansen Manufacturing Co., Waukegan, IL (US)

(72) Inventors: William S. Hansen, II, Waukegan, IL (US); Michael A. Exon, Waukegan, IL (US)

(73) Assignee: A.L. HANSEN MANUFACTURING CO., Wuakegan, IL (US)

( * ) Notice: Subject to any disclaimer, the term of this patent is extended or adjusted under 35 U.S.C. 154(b) by 0 days.

(21) Appl. No.: 16/429,743

(22) Filed: Jun. 3, 2019

(65) Prior Publication Data
US 2019/0365100 A1    Dec. 5, 2019

Related U.S. Application Data

(60) Provisional application No. 62/680,250, filed on Jun. 4, 2018.

(51) Int. Cl.
| | |
|---|---|
| A47B 96/06 | (2006.01) |
| A47B 57/58 | (2006.01) |
| A47F 5/00 | (2006.01) |
| A47F 5/08 | (2006.01) |
| F16B 45/02 | (2006.01) |
| A47F 7/14 | (2006.01) |

(52) U.S. Cl.
CPC ............ *A47B 96/067* (2013.01); *A47B 57/58* (2013.01); *A47F 5/0093* (2013.01); *A47F 5/08* (2013.01); *F16B 45/02* (2013.01); *A47F 7/143* (2013.01)

(58) Field of Classification Search
CPC .......... A47F 7/143; A47F 5/0093; A47F 5/08; A47F 5/0846; A47F 5/0838; A47F 5/0807; A47B 96/067; A47B 57/58; F16B 45/02

USPC ....... 211/113, 115, 118, 87.01, 89.01, 94.01, 211/95; 248/225.21, 304, 339, 340, 690, 248/691, 692
See application file for complete search history.

(56) References Cited

U.S. PATENT DOCUMENTS

| | | | | |
|---|---|---|---|---|
| 136,905 A | * | 3/1873 | Danner | .............. A47G 25/0685 |
| | | | | 211/104 |
| 177,936 A | * | 5/1876 | Haines | ................... A47G 25/06 |
| | | | | 211/106.01 |

(Continued)

FOREIGN PATENT DOCUMENTS

DE          2042122 A1 *  2/1972  ............... A47F 5/08

OTHER PUBLICATIONS

"Swivel Hook Assy," Drawing No. 20 04 726 2, The Knapheide Mfg. Co., 1 page, Oct. 18, 1989.

(Continued)

*Primary Examiner* — Jonathan Liu
*Assistant Examiner* — Devin K Barnett
(74) *Attorney, Agent, or Firm* — Brinks Gilson & Lione

(57) ABSTRACT

A storage assembly includes a mounting rail extending in a longitudinal direction and having a plurality of pairs of flanges defining a plurality of slots. A mounting member includes a horizontal stop plate and a back plate extending downwardly from the stop plate. The mounting member is moveable relative to the mounting rail from a disengaged position, wherein the back plate is not disposed in one of the slots, and an engaged position, wherein the back plate is disposed in one of the slots. The mounting member also includes a storage component. Methods of making and using the storage assembly are also provided.

8 Claims, 9 Drawing Sheets

(56) References Cited

U.S. PATENT DOCUMENTS

| | | | | |
|---|---|---|---|---|
| 327,939 A * | 10/1885 | Garrison | A47B 57/42 | 248/222.13 |
| 342,194 A * | 5/1886 | Finnegan | F16B 37/045 | 248/222.52 |
| 543,735 A * | 7/1895 | House | A47F 5/103 | 211/106.01 |
| 570,465 A * | 11/1896 | Dilley | B62H 3/12 | 211/19 |
| 632,234 A * | 9/1899 | Burgess | A47G 25/06 | 248/304 |
| 687,431 A * | 11/1901 | Kimball | E05F 11/00 | 292/306 |
| 724,427 A * | 4/1903 | Bonsall | A47G 25/0657 | 211/89.01 |
| 754,503 A * | 3/1904 | Rubicam | A47G 1/1686 | 248/307 |
| 764,774 A * | 7/1904 | Sargeant | B62H 3/12 | 211/18 |
| 888,032 A * | 5/1908 | Peterson | A47G 23/0225 | 248/215 |
| 914,469 A * | 3/1909 | Weaver | A47F 7/16 | 211/48 |
| D43,289 S * | 11/1912 | Sternau | D6/548 | |
| 1,653,374 A * | 12/1927 | Rossi | A46B 11/0093 | 15/248.1 |
| 1,848,937 A * | 3/1932 | Coventry | A47G 25/0678 | 248/223.41 |
| 1,936,813 A * | 11/1933 | West | A47G 25/0657 | 211/96 |
| 2,141,009 A * | 12/1938 | Meyer | A47G 25/0678 | 312/140 |
| 2,273,641 A * | 2/1942 | Henderson | B65D 71/00 | 211/65 |
| 2,309,990 A * | 2/1943 | Savi | B44D 3/123 | 15/174 |
| 2,344,339 A * | 3/1944 | Zwald | B60R 7/10 | 224/482 |
| 2,369,336 A * | 2/1945 | Cable | A47J 45/02 | 248/225.21 |
| 2,447,128 A * | 8/1948 | Logan | A47G 25/08 | 248/214 |
| 2,485,201 A * | 10/1949 | Jewett | A47G 25/746 | 211/96 |
| D175,455 S * | 8/1955 | Bartleman | D6/572 | |
| 2,754,974 A * | 7/1956 | Larson | B25H 3/04 | 211/70.6 |
| 2,842,264 A * | 7/1958 | Larson | A47G 29/08 | 206/526 |
| 2,919,881 A * | 1/1960 | Eames | A47K 10/10 | 248/290.1 |
| 3,285,426 A * | 11/1966 | Wilcke | B25H 3/04 | 211/70.6 |
| 3,289,994 A * | 12/1966 | Burmeister | A47F 5/0823 | 248/220.41 |
| 3,343,684 A * | 9/1967 | Galier | A63D 15/10 | 211/89.01 |
| 3,612,426 A * | 10/1971 | Germock, Jr. | B65H 75/4476 | 242/407 |
| 4,308,961 A * | 1/1982 | Kunce | A47F 5/0853 | 211/57.1 |
| 4,609,233 A | 8/1986 | Walla | | |
| 4,658,967 A * | 4/1987 | Wang | A47G 25/0678 | 211/182 |
| 4,750,698 A * | 6/1988 | Barnes | A47F 5/0869 | 211/59.1 |
| 4,773,172 A * | 9/1988 | Fast | A47F 5/0838 | 40/657 |
| 4,775,127 A | 10/1988 | Nakamura | | |
| 4,882,868 A * | 11/1989 | Fast | A47F 5/0869 | 40/642.01 |
| 4,905,846 A * | 3/1990 | Calvert | A47F 5/0823 | 211/59.1 |
| 4,936,469 A * | 6/1990 | Drower | A47F 5/08 | 211/69.8 |
| 5,060,897 A * | 10/1991 | Thalenfeld | A47F 5/08 | 211/57.1 |
| 5,080,238 A * | 1/1992 | Hochman | A47F 5/0869 | 211/106.01 |
| 5,104,083 A * | 4/1992 | Shannon | B60R 7/10 | 211/105.1 |
| 5,154,304 A * | 10/1992 | McAuley | A47F 5/0846 | 211/106.01 |
| 5,312,081 A * | 5/1994 | Martin | F16L 3/1203 | 211/119.004 |
| 5,348,167 A * | 9/1994 | Jensen | A47F 5/0823 | 211/57.1 |
| 5,398,820 A * | 3/1995 | Kiss | A47F 5/0884 | 211/13.1 |
| 5,433,413 A * | 7/1995 | Adams | A47G 1/17 | 248/205.3 |
| 5,441,161 A * | 8/1995 | Merl | A47F 5/0838 | 211/57.1 |
| 5,480,206 A | 1/1996 | Hathaway et al. | | |
| 5,584,462 A * | 12/1996 | Reese | A47G 1/202 | 248/339 |
| 5,584,521 A | 12/1996 | Hathaway et al. | | |
| 5,727,698 A * | 3/1998 | Lai | A47F 7/02 | 211/87.01 |
| 5,853,092 A * | 12/1998 | Goodman | A47F 5/0823 | 211/70.6 |
| 5,897,002 A * | 4/1999 | Carlino | B25H 3/04 | 211/106 |
| 5,906,403 A | 5/1999 | Bestler et al. | | |
| 6,257,409 B1 * | 7/2001 | Lin | B25H 3/04 | 206/376 |
| 6,283,311 B1 * | 9/2001 | Lee | B25H 3/006 | 206/377 |
| 6,289,618 B1 * | 9/2001 | Kump | A47F 5/0823 | 248/220.42 |
| 6,299,000 B1 * | 10/2001 | Cabrera | A47B 81/005 | 211/104 |
| 6,349,909 B1 * | 2/2002 | Zarrow | A47F 5/0823 | 211/57.1 |
| 6,427,500 B1 | 8/2002 | Winerman et al. | | |
| 6,557,807 B1 | 5/2003 | Belanger | | |
| 6,604,637 B2 * | 8/2003 | Lane | A47F 5/0823 | 211/57.1 |
| 6,607,234 B1 | 8/2003 | Schmeichel | | |
| 6,637,707 B1 * | 10/2003 | Gates | A47B 81/005 | 211/64 |
| 6,789,771 B1 * | 9/2004 | Shick | A63F 13/02 | 248/121 |
| 6,886,791 B2 | 5/2005 | Dettorre | | |
| 6,932,223 B1 * | 8/2005 | Lee | B25H 3/04 | 206/349 |
| 6,935,518 B2 * | 8/2005 | Winig | A47B 96/027 | 211/106.01 |
| 7,040,125 B2 | 5/2006 | Ciezki et al. | | |
| 7,228,977 B2 * | 6/2007 | Perkins | A47B 83/001 | 211/87.01 |
| 7,427,053 B2 * | 9/2008 | Nawrocki | A47F 5/0006 | 211/57.1 |
| 7,658,265 B1 * | 2/2010 | Dooley | E06C 7/146 | 182/129 |
| 7,694,933 B2 * | 4/2010 | Washer | A47F 5/0823 | 248/682 |
| 7,802,680 B2 * | 9/2010 | Krebs | B25H 3/04 | 206/349 |
| 8,550,265 B2 * | 10/2013 | Botkin | A47B 96/067 | 211/90.01 |
| 9,339,130 B1 * | 5/2016 | Johnson | A47F 7/022 | |
| D855,408 S * | 8/2019 | Tsai | D7/600.1 | |
| 2004/0020880 A1 * | 2/2004 | Kao | A47F 7/024 | 211/70.6 |
| 2004/0108734 A1 | 5/2004 | Maple et al. | | |
| 2006/0022105 A1 * | 2/2006 | MacKay | F16B 45/00 | 248/304 |

(56) References Cited

U.S. PATENT DOCUMENTS

| | | | | |
|---|---|---|---|---|
| 2007/0251904 A1* | 11/2007 | Winig | A47B 96/06 | |
| | | | | 211/106.01 |
| 2008/0053931 A1* | 3/2008 | Newbould | A47B 96/067 | |
| | | | | 211/88.01 |
| 2008/0169395 A1* | 7/2008 | Bullock | B60P 7/0807 | |
| | | | | 248/304 |
| 2008/0179898 A1 | 7/2008 | Juga et al. | | |
| 2010/0264102 A1* | 10/2010 | Barkdoll | A47F 5/0823 | |
| | | | | 211/106.01 |
| 2011/0042333 A1* | 2/2011 | Magnusson | F16M 13/02 | |
| | | | | 211/70.6 |
| 2012/0012726 A1* | 1/2012 | Daniels | A47G 25/0678 | |
| | | | | 248/304 |
| 2012/0111814 A1* | 5/2012 | Kao | A47F 5/0846 | |
| | | | | 211/70.6 |
| 2012/0152871 A1* | 6/2012 | Kao | A47F 5/0846 | |
| | | | | 211/70.6 |
| 2012/0181244 A1* | 7/2012 | Wang | A47G 25/06 | |
| | | | | 211/106.01 |
| 2015/0250333 A1* | 9/2015 | Schaefer | A47B 73/008 | |
| | | | | 211/89.01 |
| 2017/0127867 A1* | 5/2017 | Malott | A47G 29/00 | |

OTHER PUBLICATIONS

"3 Swivel Hook Bar Assy 5: C-C No Paint," Drawing No. 25 17 440 0, The Knapheide Mfg. Co., 1 page, Aug. 25, 1998.

Unistrut® The Original Metal Framing, Unistrut Product Group, http://www.unistrut.com/Browse/cat_pg.php?P=S02_P4100, 1 page, 2005.

"Accessories," Triton Trailer, 1 a e, date prior to Apr. 2006.

\* cited by examiner

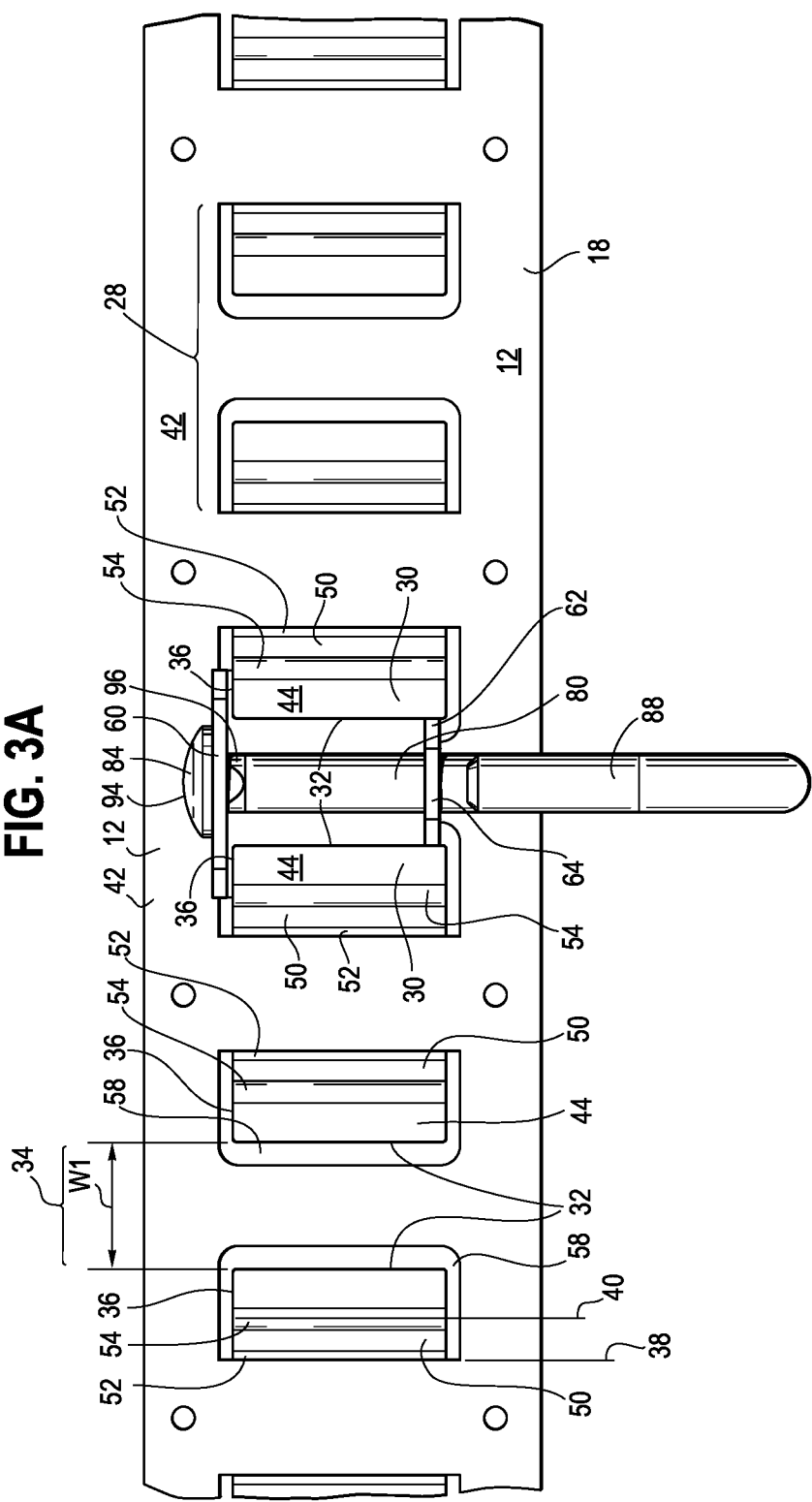

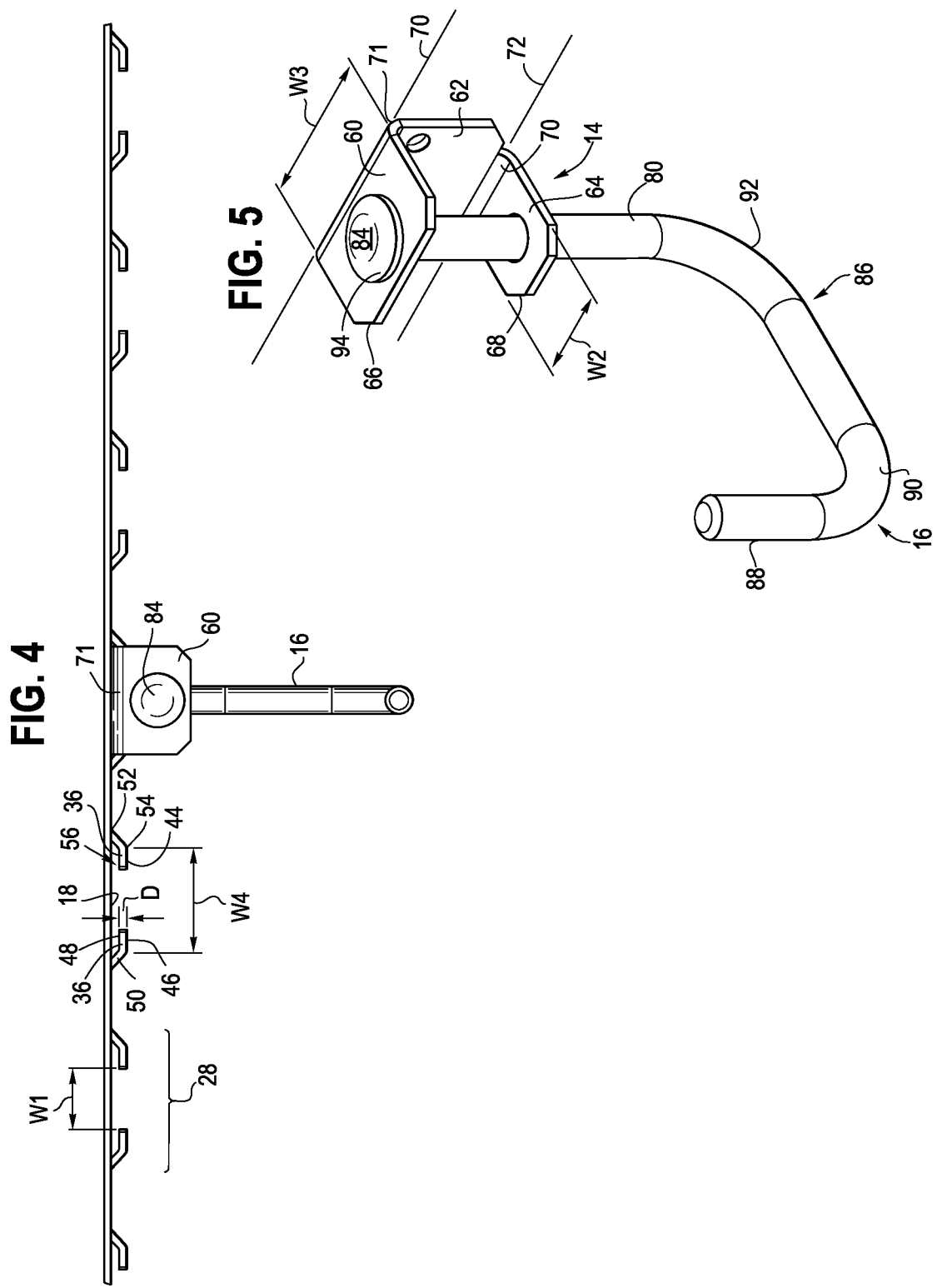

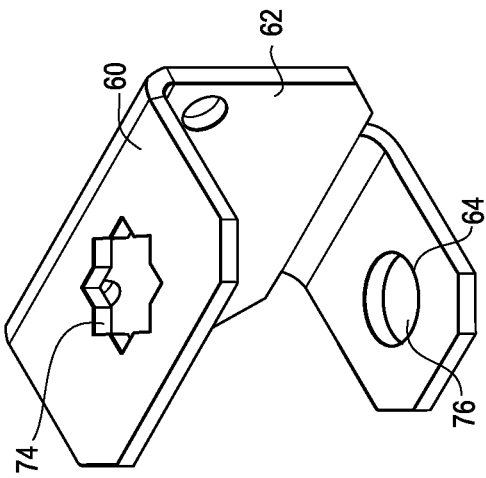
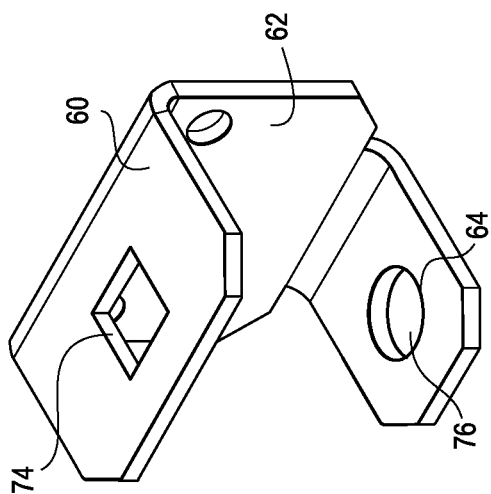
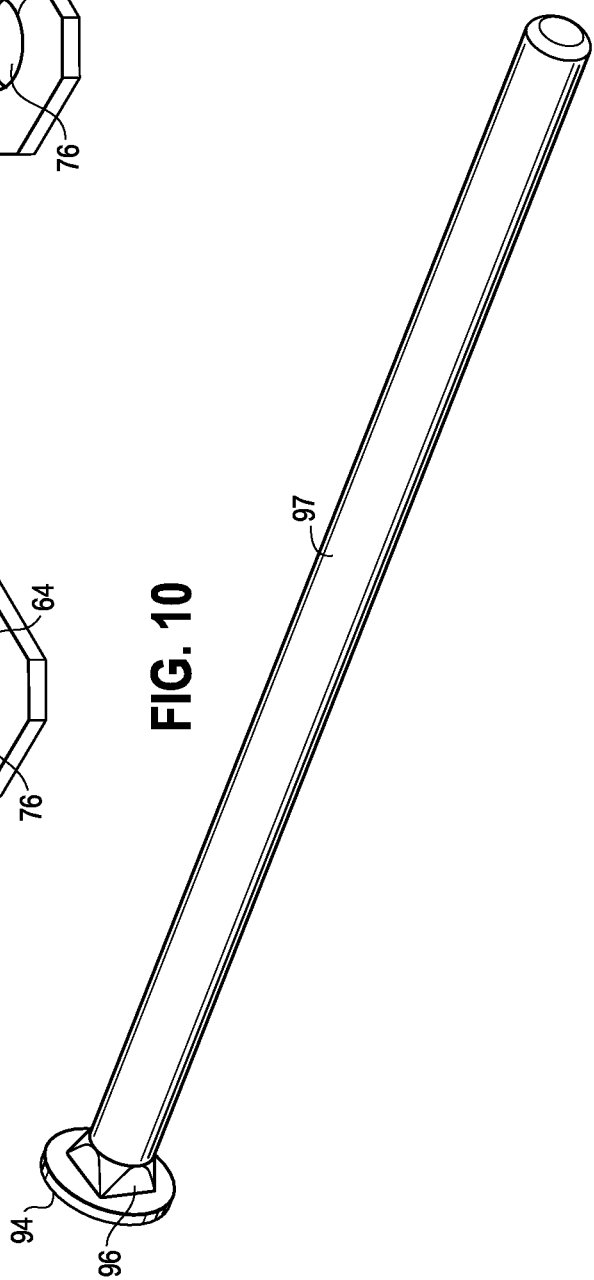

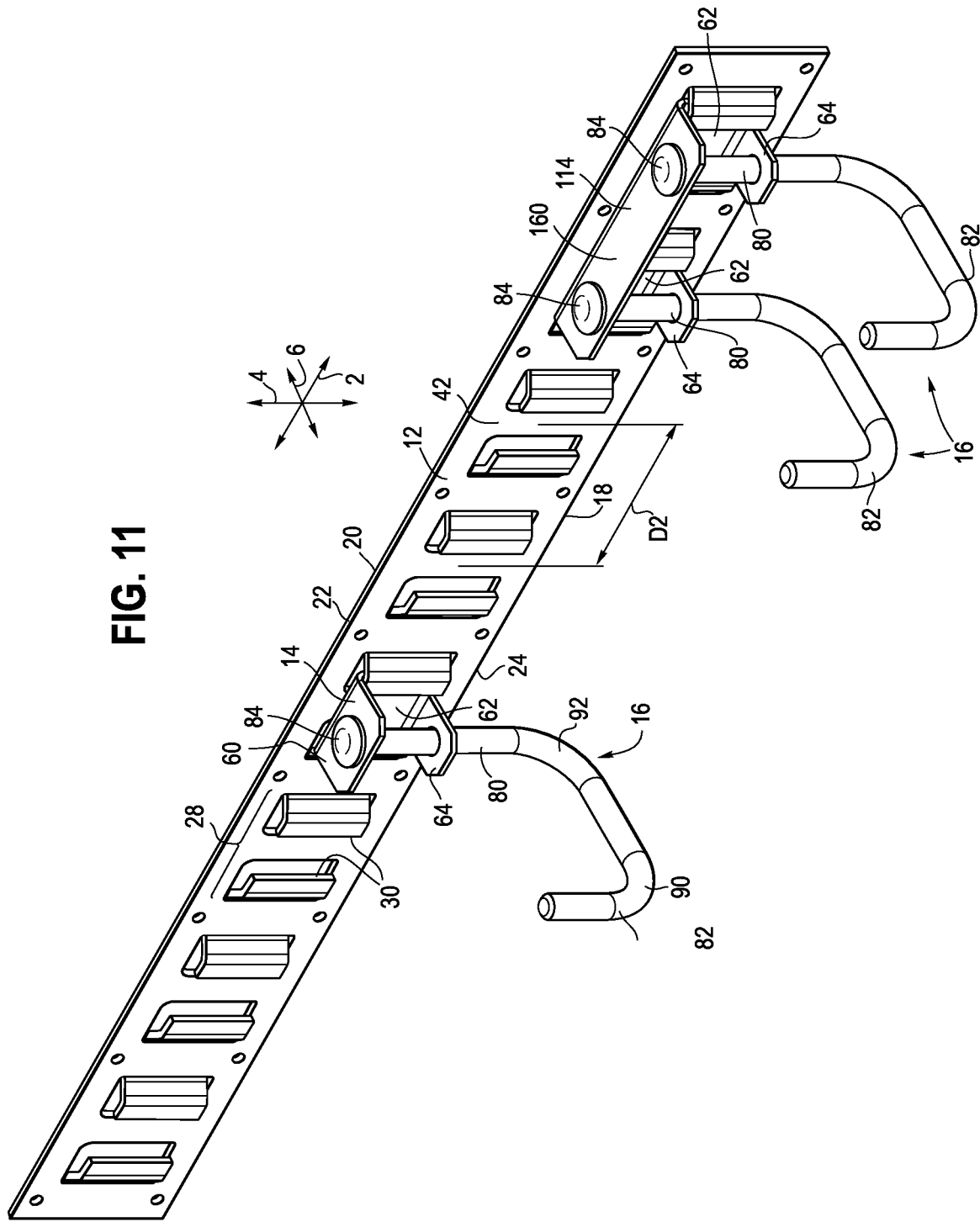

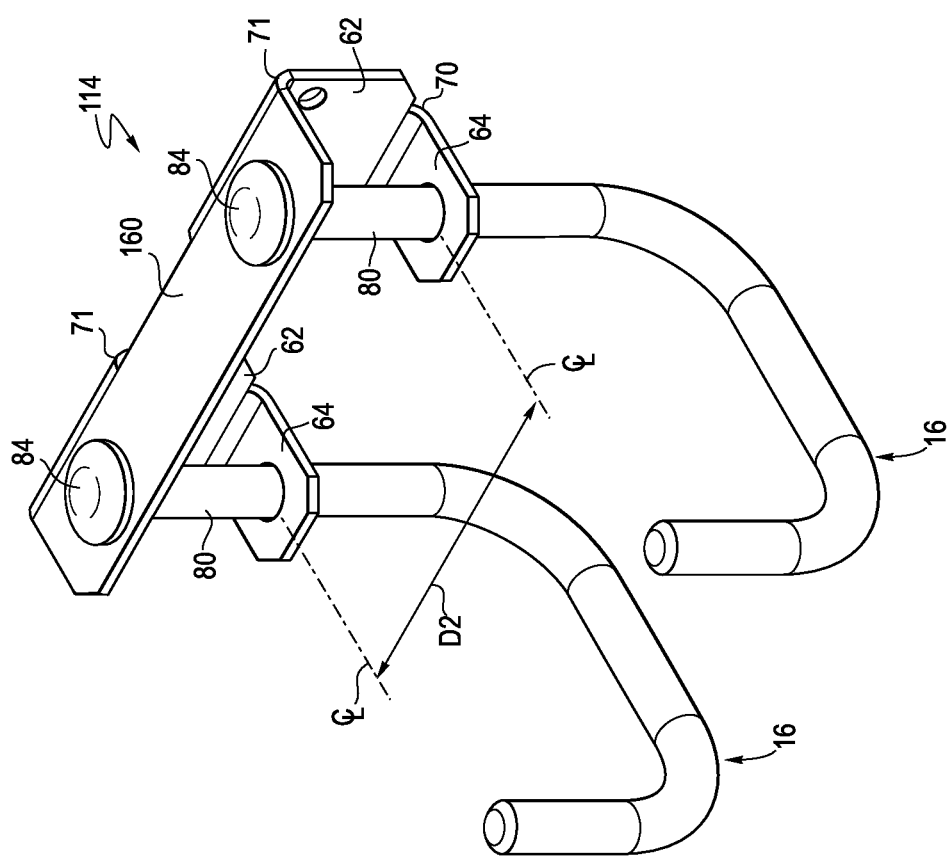

US 10,729,244 B2

RECONFIGURABLE STORAGE ASSEMBLY

This application claims the benefit of U.S. Provisional Application No. 62/680,250, filed Jun. 4, 2018, the entire disclosure of which is hereby incorporated herein by reference.

FIELD OF THE INVENTION

The present invention relates generally to a storage assembly, and in particular, to a storage assembly that is reconfigurable.

BACKGROUND

J-shaped hooks are commonly used for holding or storing various items. For example, such hooks are often installed inside a trailer. Typically, each hook is permanently installed at a single, fixed location. For example, a straight rod can be inserted through aligned holes in a C-shaped channel, with the lower end of the rod bent, e.g., twice, after insertion to form a hook portion. The hook is thereby permanently installed and cannot be removed from the channel, or moved longitudinally along its length. As such, if the hook is damaged, e.g., broken or bent, it can be difficult and expensive to repair or replace.

SUMMARY

The present invention is defined by the following claims, and nothing in this section should be considered to be a limitation on those claims. By way of introduction, the embodiment of a storage assembly described below may be connected to any component. For example and without limitation, the storage assembly may be mounted on any wall or mounting surface, such as a trailer wall or building wall, or on a rack, frame or other support structure.

In one embodiment, the storage assembly includes a mounting rail extending in a longitudinal direction. The mounting rail includes a first back plate defining a first surface and a plurality of pairs of flanges. Each of the pairs of flanges includes opposing free edges and upper stop edges, with the opposing free edges defining a plurality of first slots between the opposing free edges. Each of the pairs of flanges defines a second surface spaced outwardly from the first surface so as to define a second slot between the first and second surfaces. A mounting member includes a horizontal stop plate and a second back plate extending downwardly from the stop plate. The mounting member is moveable relative to the mounting rail from a disengaged position, wherein the second back plate is not disposed in one of the second slots, and an engaged position, wherein the second back plate is disposed in one of the second slots. The stop plate engages the upper stop edges when the mounting member is in the engaged position. The mounting member also includes a storage component.

In another aspect, a method of making a mounting rail for a storage assembly includes providing an elongated rail having a back plate with a front and rear surface, cutting a plurality of pairs of U-shaped notches in the back plate, wherein the U-shaped notches in each of the pairs open away from each other and define a plurality of flanges, and pressing the flanges away from the back plate portion such that the rear surface of the flanges is spaced apart from the front surface of the back plate so as to define a plurality of slots between the rear and front surfaces.

In another aspect, a method of assembling a storage assembly includes sliding the second back plate downwardly into one of the second slots and engaging at least one of the pairs of upper stop edges with the horizontal stop plate.

The various aspects and embodiments provide significant advantages. In particular, a storage member, for example including without limitation a hook member, can be easily installed and removed, for example if the storage member is damaged, and in one embodiment, without any additional shaping or forming of the hook member. In addition, in one embodiment, the hook member can be fixed at a plurality of rotational positions relative to a vertical axis. In one embodiment, the storage member can be quickly and easily moved to a plurality of longitudinal positions without having to loosen or disengage any fasteners and without the assistance of any tools. As such, the various embodiments provide additional flexibility in positioning the storage member, e.g., by translating and/or rotating the storage member.

The foregoing paragraphs have been provided by way of general introduction, and are not intended to limit the scope of the following claims. The various preferred embodiments, together with further advantages, will be best understood by reference to the following detailed description taken in conjunction with the accompanying drawings.

BRIEF DESCRIPTION OF THE DRAWINGS

FIG. 3A is a partial front view of the storage assembly shown in FIG. 1.

FIG. 4 is a top view of the storage assembly shown in FIG. 1.

FIG. 5 is a perspective view of one embodiment of a mounting member and hook member.

FIG. 9A is a perspective view of one embodiment of a mounting member.

FIG. 9B is a perspective view of another embodiment of a mounting member.

FIG. 10 is a perspective view of a pre-formed hook member.

FIG. 11 is a perspective view of the hook assembly shown in FIG. 1 with a second embodiment of a mounting member mounted thereon.

FIG. 12 is a perspective view of the mounting member shown in FIG. 11 with a pair of hook members engaged therewith.

DETAILED DESCRIPTION OF THE PRESENTLY PREFERRED EMBODIMENTS

Figure 1:
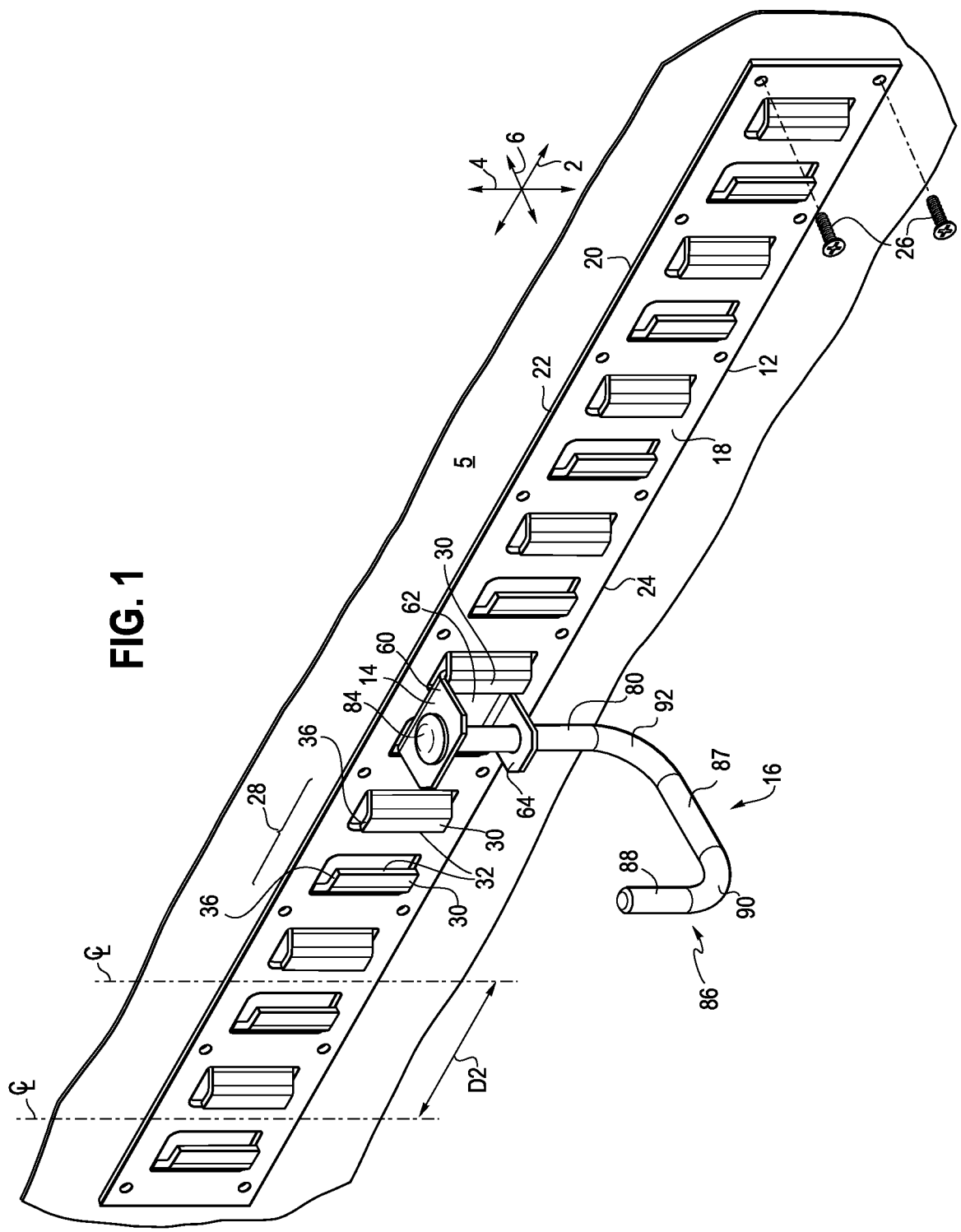
FIG. 1 is a perspective view of a first embodiment of a storage assembly with a hook member in a first position.
Figure 3B:
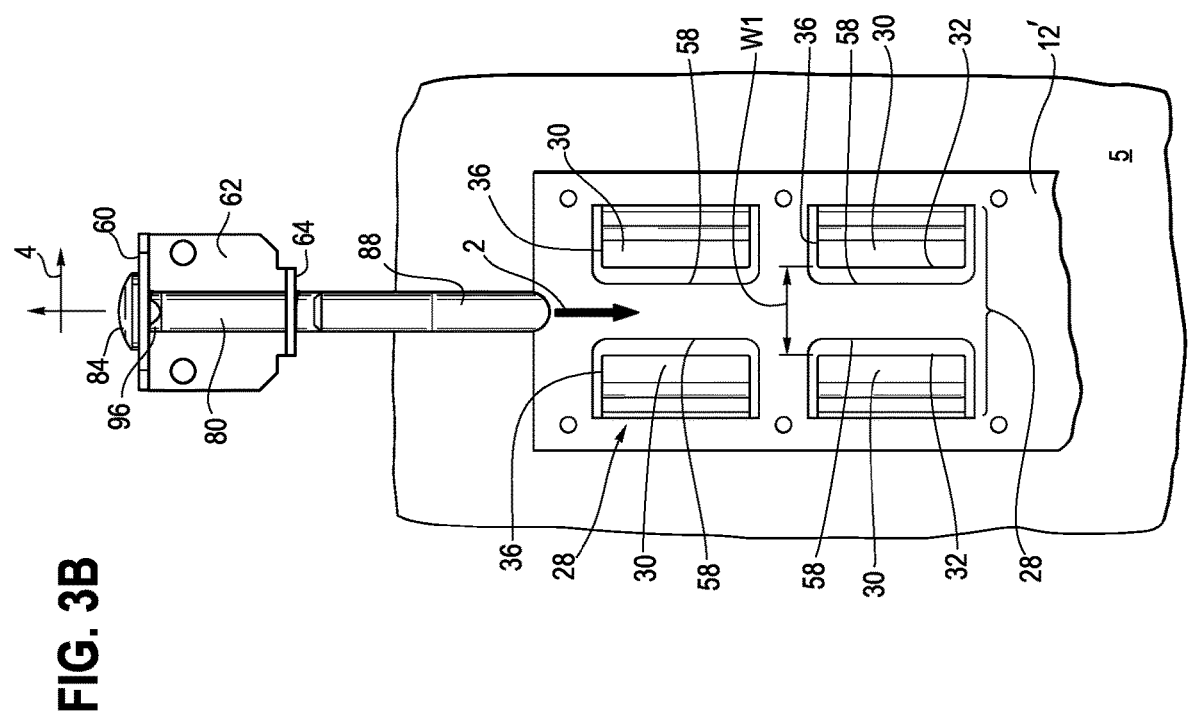
FIG. 3B is a partial front view of another embodiment of a storage assembly.
Figure 8:
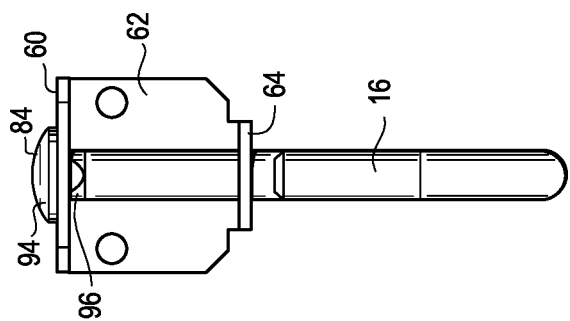
FIG. 8 is a front view of the mounting member and hook member shown in FIG. 5.
Figure 7:
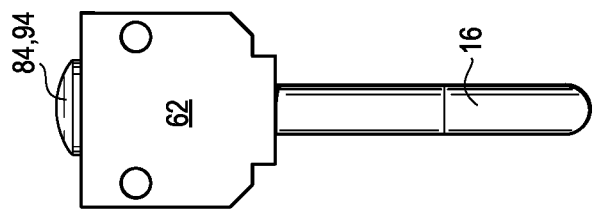
FIG. 7 is a rear view of the mounting member and hook member shown in FIG. 5.
Figure 6:
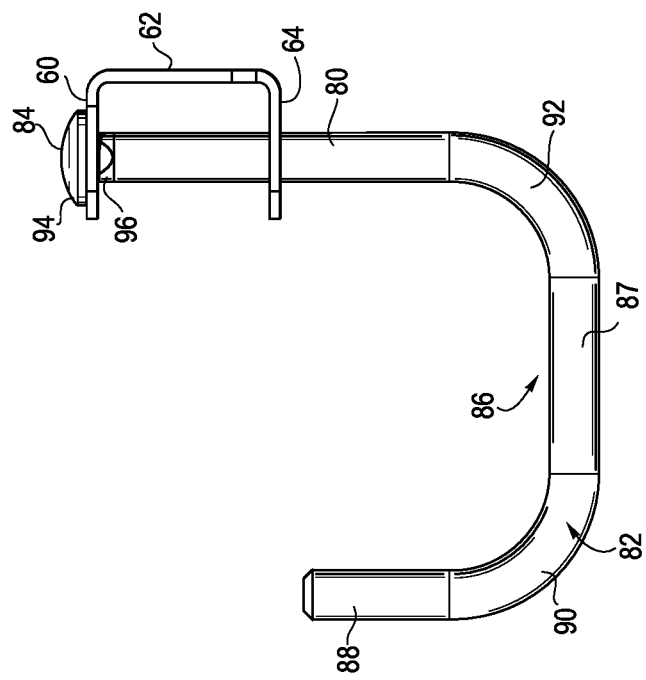
FIG. 6 is a perspective view of the mounting member and hook member shown in FIG. 5.

It should be understood that the term "longitudinal," as used herein means of or relating to length or the lengthwise ("X") direction 2 of a rail in the embodiment of FIG. 1 and Y direction in the embodiment of FIG. 3A. The term "lateral," as used herein, means directed toward or running perpendicular to the longitudinal direction, whether up and down (Y direction 4 in FIG. 1 or X direction in FIG. 3A) or in and out (Z direction 6). The term "coupled" means connected to or engaged with, whether directly or indirectly, for example with an intervening member, and does not require the engagement to be fixed or permanent, although it may be fixed or permanent, and includes both mechanical and electrical connection. It should be understood that the use of numerical terms "first," "second" and "third" as used herein does not refer to any particular sequence or order of components; for example "first" and "second" openings may refer to any sequence of such openings. The term "plurality" means two or more. The phrase "storage member" refers to any component or configuration capable of being used to store, secure, restrain, hold and/or support another component, and includes without limitation a hook member, trash container, peg, hole or opening, tab, etc. The term "plate" as used herein generally refers to a thin member (planar or curved), and may include a web portion of a formed sheet metal part, or various separate members that are otherwise attached, for example by welding, mechanical fasteners or the like.

Referring to FIGS. 1-6 and 12-17, various embodiments of a storage assembly include a mounting rail 12, a mounting member 14 and a storage member 16, configured as a hook member in one embodiment. The mounting rail, mounting member and storage member can be made of various materials, including metal, for example and without limitation steel, aluminum, stainless steel, etc., or plastic. The mounting rail can be made as stamping. The mounting member can be made as a metal casting, including for example a zinc die cast, steel, aluminum, etc., as well as from plastic, for example and without limitation injection molded plastic, or from formed sheet metal.

In one embodiment, the mounting rail 12 is configured as a plate member, or back plate 42, having a front and rear surface 18, 20, and upper and lower edges 22, 24. The mounting rail 2 is mounted to a support member having a surface defining a plane 5, such as a wall or frame, for example in a trailer or a building structure. The mounting rail 12 is secured to the support member 5 with mechanical fasteners 26, such as screws, extending through openings in the mounting rail or by other mechanical means, adhesives, welding, or combinations thereof. The mounting rail 12 is positioned in a horizontal orientation in one embodiment (FIG. 1), and extends in a longitudinal direction, although it should be understood that a mounting rail 12' can be arranged in other orientations, including a vertical or oblique orientation as shown in FIG. 3A. In one embodiment, the mounting rail may include a plurality of lightening holes, which do not adversely affect the strength of the rail. Of course, the mounting rail can be formed without such holes, or with other holes having different shapes and patterns.

The mounting rail 12, 12' has a plurality of pairs 28 of flanges 30. The pairs are spaced apart a distance D2, as shown for example in FIG. 1 as the distance between centerlines defined between the centerlines of each pair. Each of the pairs 28 of flanges 30 includes opposing free edges 32 defining a plurality of slots 34 between the opposing free edges. The flanges 30 also include upper stop edges 36. The flanges are bent along two bend/fold axes 38, 40, defining a pair of curved corners 52, 54, with an angled 50 portion extending outwardly from the back plate 42, and a flat portion 44 extending along the longitudinal axis 2 parallel to the back plate 42. The upper edge of the flat portion defines at least in part the stop edges 36. The flanges 30 have front and rear surfaces 46, 48, with the rear surface 48 of the flanges spaced outwardly from the front surface 18 of the back plate so as to define a slot 56 between the first and second surfaces, with the slot 56 having a depth D defined between the surfaces.

In one embodiment, the mounting rail 12, 12' is formed by cutting pairs of U-shaped notches 58 in the plate. The U-shaped notches in each of the pairs open away from each other and define the plurality of flanges 30. The flanges are pressed away from a plane defined by the back plate 42, and bent about the fold/bend axes 38, 40, such that the rear surface of the flanges 48 is spaced apart from the front surface 18 of the back plate and defines the plurality of slots 56 between the rear and front surfaces. The U-shaped notches are spaced apart a predetermined distance such that after the forming step, the free edges 32 are spaced apart the width W to define the slot 34. In various embodiments, the width (W1) of the slot 34 is 28.9 mm (e.g., 10-50 mm), while the depth D of the slot 56 is 4.5 mm (e.g., 2-10 mm), although it should be understood that other dimensions would be suitable, for example depending on the strength and size requirements of the particular application. The cutting and pressing may be performed simultaneously. The elongated rail may be cut after a predetermined number of U-shaped notches have been cut and the corresponding flanges pressed or formed.

Referring to FIGS. 1-3B and 7-9B, the mounting member 14 is preferably configured as a C-shaped bracket having a stop plate 60, a back plate 62 extending downwardly from the stop plate and a guide plate 64 extending forwardly from the back plate. The guide plate has a width W2, which is the same width, or slightly greater than the width W1, of the slot 34. The stop plate 60 and guide plate 64 are spaced apart and extend from the back plate at upper and lower portions thereof. In one embodiment, the stop plate and guide plate are parallel, and orthogonal to the back plate, although the various plates may be arranged in other angular relationships relative to each other and the back plate. The stop plate and guide plate may include in one embodiment chamfered corner portions 66, 68. The stop plate has a greater width W3 than the width W2 of the guide plate, and is greater than the width W1 of the slot, such that the stop plate 60 overlies at least a portion of the stop edges 36 when the mounting member is installed in an engaged position on the mounting rail. The mounting member may be formed from a piece of sheet metal along upper and lower bend/fold lines 70, 72, defining curved or bent corners 71, 73, such that the entire mounting member is made from a single, homogenous piece of material.

The stop plate 60 defines a mounting platform having a first opening 74 formed therethrough as shown in FIG. 9A. The opening 74 preferably has a polygonal shape, including for example and without limitation a star shape (FIG. 9B), a hexagon shape, a pentagon shape, a square shape, etc. The opening can also be configured as a D-shape, or any shape that mates with another cross-section so as to prevent relative rotation between the two members. In another embodiment, where rotation is desired, the opening can have a circular cross-section. The guide plate 64 has a second opening 76 vertically aligned with the first opening 74. The second opening is preferably circular, and is dimensioned to receive a shaft of a storage member, such as a hook member. The back plate 62 includes one or more openings 78 that receive a fastener. The mounting member 14 may be held in place by gravity when installed in the mounting rail. If a more permanent connection is required, it can be attached with a fastener as noted, or with adhesive, welding or other connection, or may simply be directly mounted to a wall for example with fasteners, adhesives or welding without an intervening mounting rail.

Referring to FIGS. 11 and 12, in one embodiment, a mounting member 114 is configured with an elongated stop plate 160, which has a pair of back plates 62 extending downwardly from the stop plate 160 and a pair of guide plates 64 extending forwardly from the back plates. The back plates 62 are arranged on the stop plate so as to be aligned with different pairs of 28 of flanges, for example with centerlines of the back plates 62 (and guide plates 64) spaced apart a distance D2 as shown in FIG. 12. The pairs of flanges 28 may be adjacent, as shown in FIG. 11, or spaced apart with one or more other intervening pairs of flanges disposed between the pairs that are engaged by the back plates 60. The elongated stop plate 160 engages the stop edges 36 of any flanges 30 underlying the stop plate, regardless of whether the flanges defining those stop edges are engaged with corresponding back plates 60. A pair of storage members 16 (e.g., hook members 86) may be coupled to the stop plate 160, which is configured with a pair of openings 74 overlying corresponding openings 76 in the pair of guide plates 64, with the storage members extending through the aligned openings 74, 76.

Referring to FIGS. 1, 2, 3 and 5, the storage member 16 is configured as a hook member 86, which includes a shaft 80, oriented substantially vertically in a preferred embodiment, a hook portion 82, and a head portion 84. The hook member is preferably J-shaped. In one embodiment, the hook portion 82 includes a substantially linear horizontal portion 87 and a substantially linear vertical or upturned end portion 88 joined by a curved portion 90. In addition, the horizontal portion of the hook portion is joined to the shaft 80 by a curved portion 92. In other embodiments, the entirety of the hook portion is curved. The hook member 86 may be made from an elongated shaft 97, as shown in FIG. 10, with the shaft being bent along the curved portions 90, 92 into a J-shape, for example after the shaft is inserted through openings 74, 76. Or the hook, which is pre-formed in the J-shape, may be threaded through the openings, with the end portion 88 first passed through the first opening 74 and then opening 76, with the remainder of the hook then following until the shaft 80 is disposed in the openings 74, 76.

It should be understood that the storage member may be configured as other hooks, or as structures other than a hook, and may be defined simply as the opening 74 in the mounting member, to which various items may be secured, including rope, bungie cords and the like. Other storage members may include structures for holding various tools, trash containers, and/or other accessories.

The hook member, and in particular the head portion 84, includes a cap 94 and a locator 96 positioned beneath the cap. The locator 96 has a shape that mates with the shape of the opening 74 in the mounting portion, for example a mating, but not necessarily identical, polygonal shape. The cap 94 has a width or surface area greater than the opening 74, such that it bears against the top of the mounting portion once the hook member is installed on the mounting member.

During installation, the back plate 62 of the mounting member is slid from a disengaged position, where the back plate is not disposed in one of the slots 56, downwardly into one of the slots 56 to an engaged position, where a bottom surface of the horizontal stop plate 60 is engaged with at least one of the pairs of upper stop edges 36, and in particular the stop edge portion of the flat portion 44. The width W4 of the slot 56, defined in one embodiment as the distance between opposing corner 54, or the combined width of the flat portions 44 and slot 34, is the same as, or slightly greater than the width of the back plate 62 such that the back plate 62 can easily slide into the slot 56. As the back plate 62 is slid into the slot 56, the guide plate 64 slides simultaneously downwardly within the slot 34. In one embodiment, shown in FIG. 11, the pair of back plates 62 and guide plates 64 are simultaneously slid in pairs of spaced apart slots 56, 34.

Figure 2:
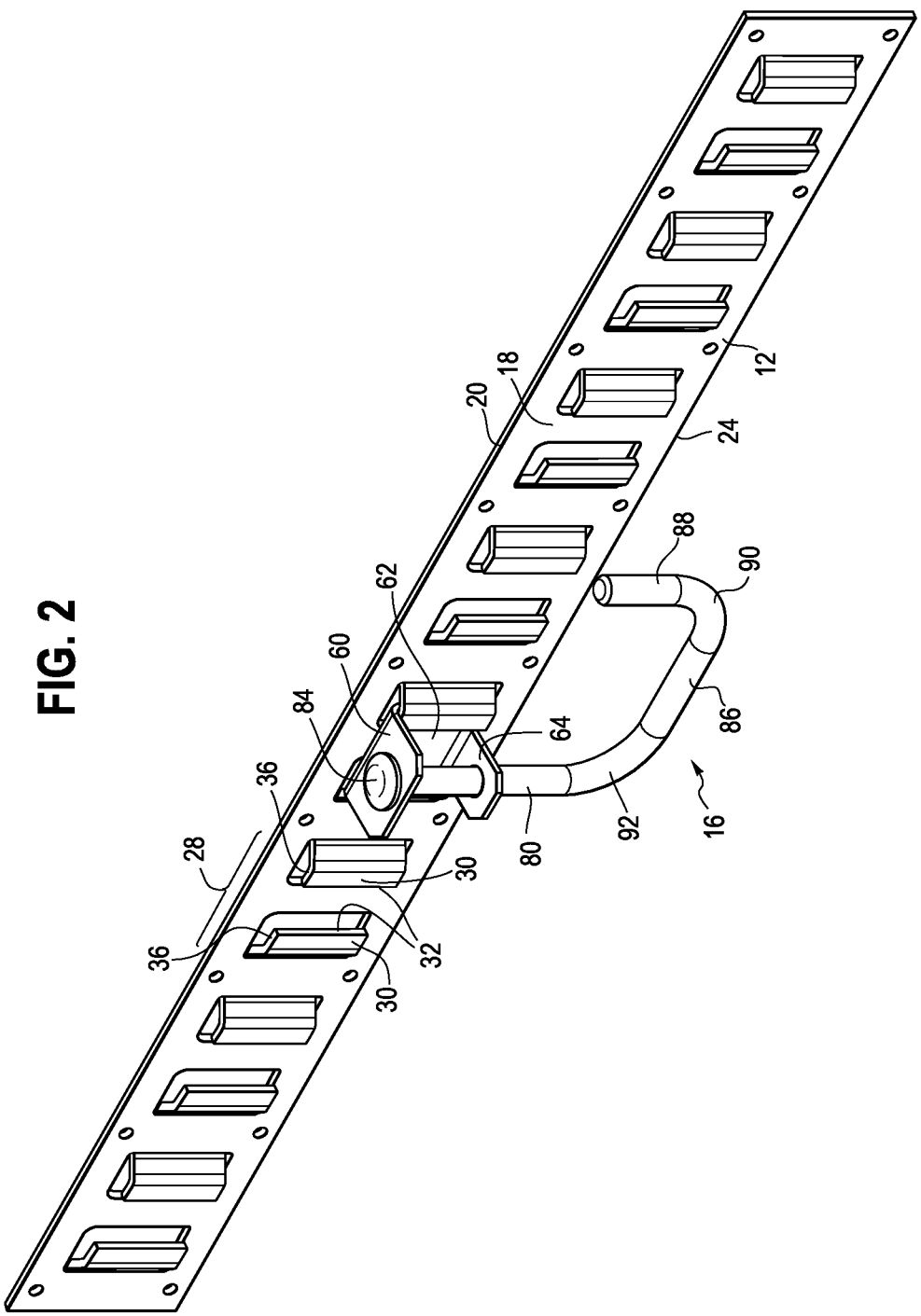
FIG. 2 is a perspective view of the storage assembly shown in FIG. 1 with the hook member in a second position.

The hook member 86 may be adjusted to different rotational positions by sliding, e.g., lifting, the hook member vertically upwardly relative to the stop plate 60 until the locater 96 is disengaged with the opening 74 in the stop plate, rotating the hook member relative to the opening, and sliding the hook member downwardly relative to the stop plate until the locator 96 of the hook member is reengaged with the opening 74 in a second position. The engagement between the locator 96 and opening 74 prevents rotation of the hook member relative to the stop plate when the hook member is in the first position with the hook member 86 extending orthogonal to the mounting rail as shown in FIG. 1, and the second position with the hook member 86 extending parallel to the mounting rail as shown in FIG. 2.

In addition, the mounting member may be easily relocated at any position along the mounting rail simply by sliding the back plate upwardly out of the slot 56, and aligning the back plate with a slot of another pair of flanges and inserting the back plate into the slot until the stop plate engages the stop edges 36. In this way, the storage member(s) can be easily moved to any desired position, both along the mounting rail and also rotationally relative to the rail. In the embodiment of FIG. 1, the mounting member can be moved horizontally to any location along the rail 12, and in the embodiment of FIG. 3B, the mounting member can be moved vertically to any location along the rail 12'. For example, if hook members are not needed for tie down, they can simply be rotated to a parallel position adjacent the mounting rail such that they do not interfere with the operator. Of course, if needed, the hook member(s) can also be removed entirely from the mounting rail and stored in another location.

Although the present invention has been described with reference to preferred embodiments, those skilled in the art will recognize that changes may be made in form and detail without departing from the spirit and scope of the invention. As such, it is intended that the foregoing detailed description be regarded as illustrative rather than limiting and that it is the appended claims, including all equivalents thereof, which are intended to define the scope of the invention.

What is claimed is:

1. A storage assembly comprising:
a mounting rail extending in a longitudinal direction, the mounting rail comprising a first back plate defining a first surface and a plurality of pairs of flanges, each of said pairs of flanges comprising opposing free edges defining a first slot therebetween and upper stop edges, and each of said pairs of flanges defining a second surface spaced outwardly from said first surface so as to define a second slot between said first and each second surface; and
a mounting member comprising a horizontal stop plate, a second back plate extending downwardly from said stop plate, a guide plate below and spaced apart from said stop plate, and a hook; wherein the said hook comprises a head portion and a distal end portion, wherein the head portion of the hook rests upon the stop plate and the hook extends downwardly therefrom through the stop plate and guide plate, wherein a section of the hook is below the guide plate;

wherein said mounting member is moveable relative to said mounting rail from a disengaged position wherein said second back plate is not disposed in one pair of said second slots and an engaged position wherein said second back plate is disposed in one pair of said second slots, and said stop plate rests upon a corresponding pair of upper stop edges when said mounting member is in said engaged position, and said guide plate extends through a corresponding first slot associated with said one pair of said second slots.

2. The storage assembly of claim 1, wherein said stop plate has a first opening and said guide plate has a second opening vertically aligned with said first opening, wherein said hook extends through said first and second openings.

3. The storage assembly of claim 2, wherein said first opening has a first polygonal shape, and wherein said head portion comprising a locater having a second polygonal shape mating with said first polygonal shape, wherein said hook is moveable relative to stop plate between at least a first and second position, wherein said locater is engaged with said first opening to prevent rotation in each of said first and second positions.

4. The storage assembly of claim 1, wherein said longitudinal direction is horizontal wherein said plurality of pairs of flanges are horizontally spaced apart.

5. The storage assembly of claim 1, wherein said longitudinal direction is vertical wherein said plurality of pairs of flanges are vertically spaced apart.

6. The storage assembly of claim 1, wherein said first back plate comprises a corresponding through opening aligned with each flange.

7. The storage assembly of claim 1, further comprising a second mounting member comprising a second stop plate, wherein said second stop plate engages corresponding upper stop edges of a corresponding plurality of pairs of flanges when said second mounting member is stored within said corresponding plurality of pairs of flanges.

8. The storage assembly of claim 1, wherein said first back plate and said plurality of pairs of flanges are integrally formed from a single, homogenous piece of material.

* * * * *